May 23, 1961　　　　B. M. LINDNER　　　　2,985,114
TRUCKS
Filed April 4, 1960　　　　　　　　　　　　　　4 Sheets-Sheet 1
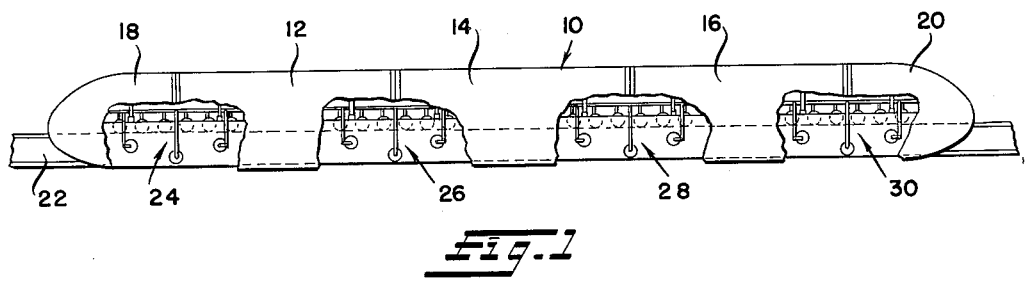
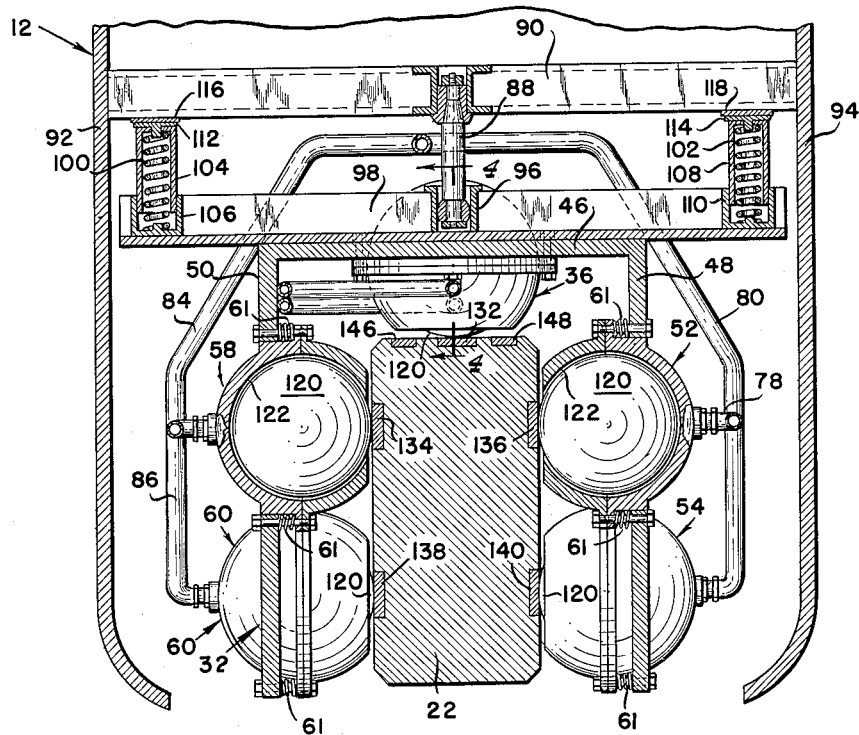
INVENTOR
BROR M. LINDNER
BY *Strauch, Nolan & Neale*
ATTORNEYS

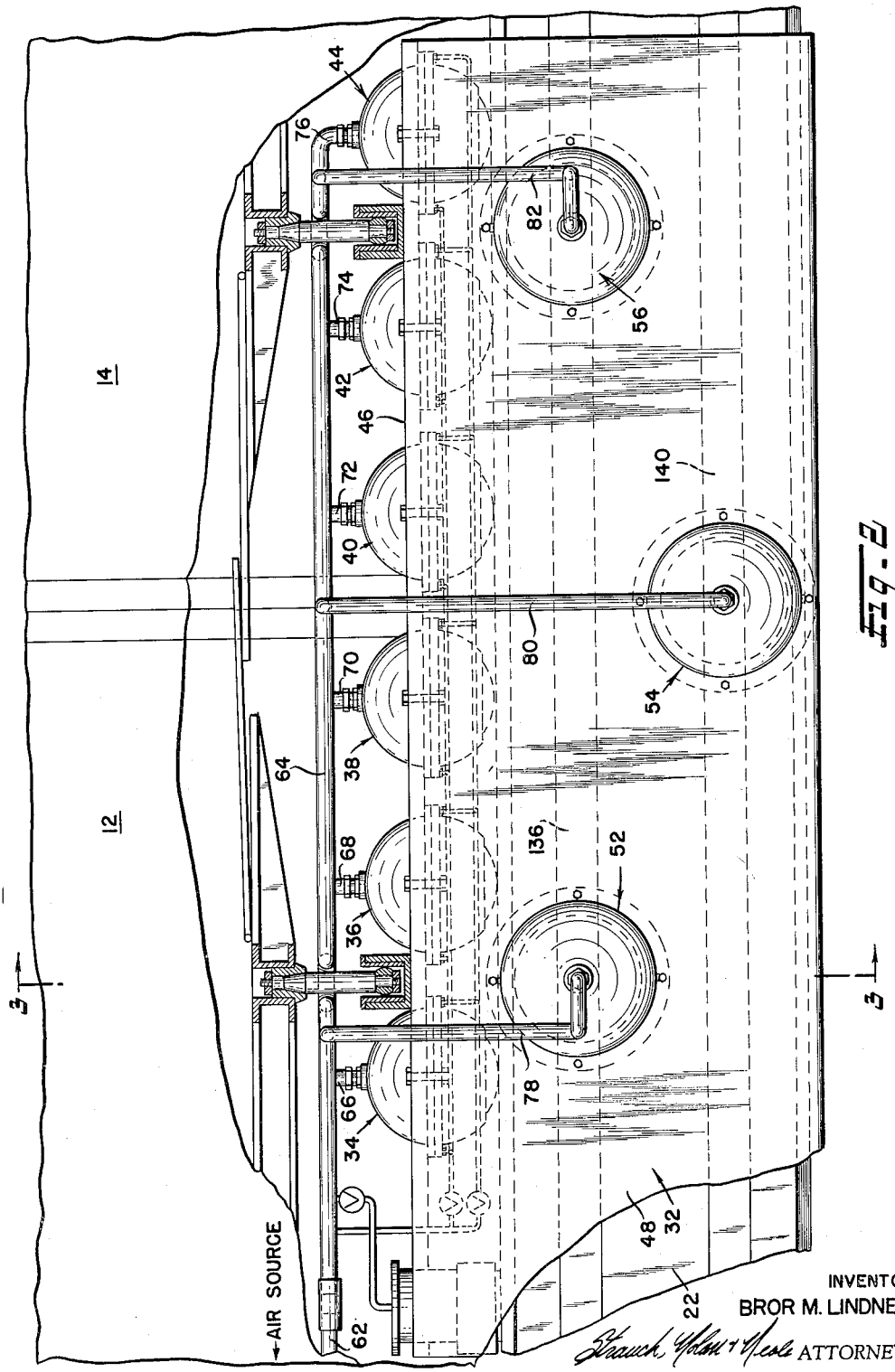

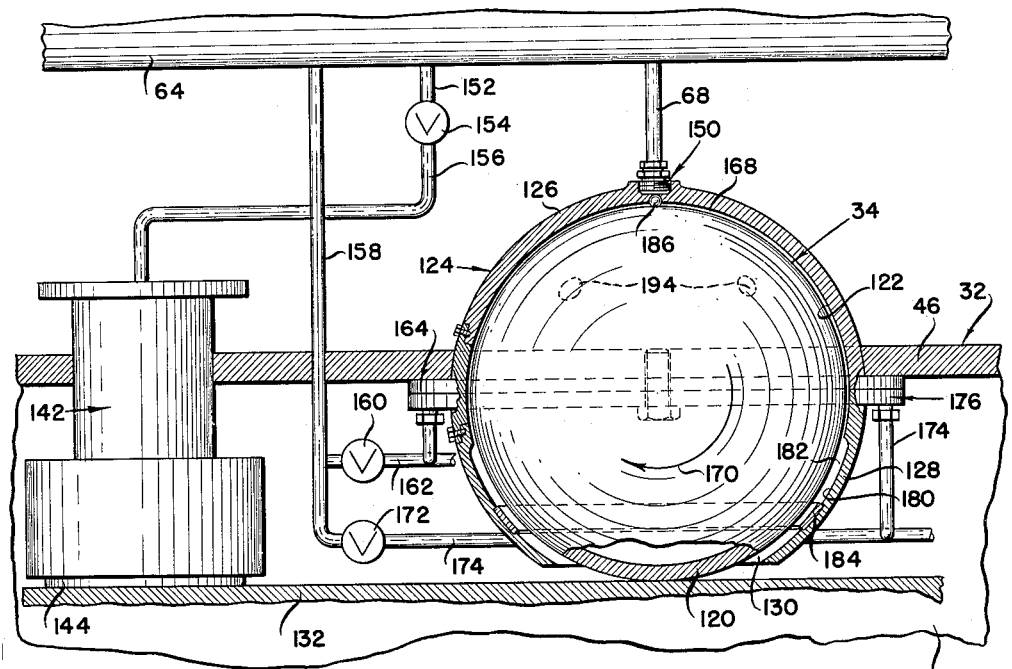
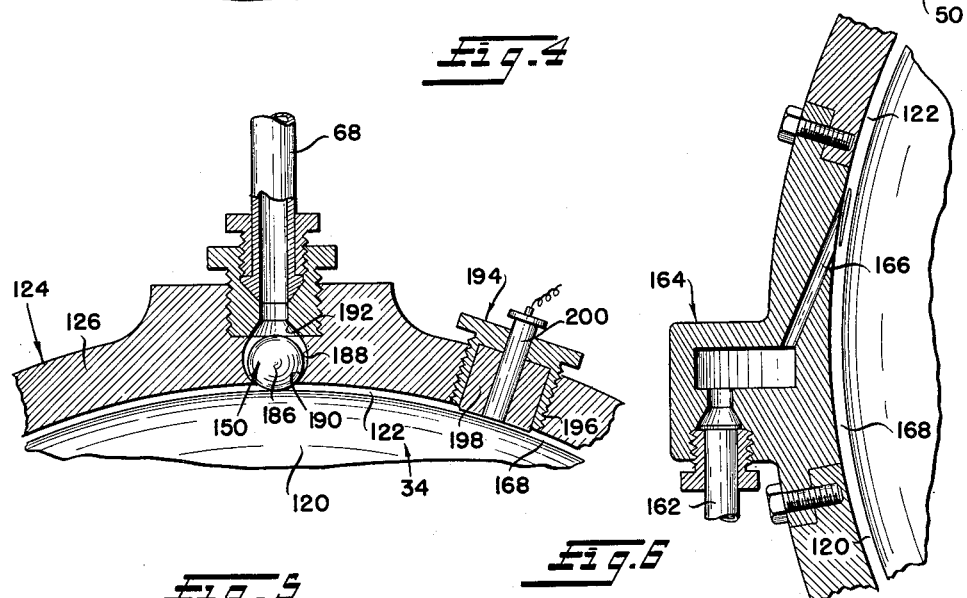

May 23, 1961  B. M. LINDNER  2,985,114
TRUCKS

Filed April 4, 1960  4 Sheets-Sheet 4

INVENTOR
BROR M. LINDNER

BY
ATTORNEYS

United States Patent Office 2,985,114
Patented May 23, 1961

2,985,114
TRUCKS
Bror M. Lindner, Stockholm, Sweden, assignor to Alwac International, Inc., Nassau, Bahamas, a corporation of Panama
Filed Apr. 4, 1960, Ser. No. 19,932
Claims priority, application Sweden Aug. 22, 1959
18 Claims. (Cl. 105—141)

The present invention relates primarily to improvements in trucks or bogies for rail supported and guided vehicles and more particularly to improvements in such trucks for monobeam supported vehicles.

A principal object of this invention is to provide new and improved low friction trucks for rail supported and guided vehicles.

More specifically, it is an object of this invention to provide a truck, of either the powered or trailer types, for rail supported and guided vehicles in which the rail engaging rolling elements are physically isolated from the remainder of the truck by a film of air.

A further and more specific object of this invention is to provide a truck, of either the powered or trailer types, for monobeam supported and guided vehicles in which the rail engaging rolling elements are mtaintained in physically isolated relation to the remainder of the truck by a film of air and more particularly in which such rolling elements are spheres.

These and other objects of this invention will become more fully apparent by reference to the appended claims and as the following detailed description proceeds in reference to the accompanying drawings wherein:

Figure 1 is a diagrammatic illustration of a plural car train supported upon a monobeam by trucks or bogies constructed in accord with the principles of the present invention;

Figure 2 is an enlarged view of one of the powered trucks of the vehicle of Figure 1 constructed in accord with the present invention and illustrates the articulation of the car superstructure upon such truck;

Figure 3 is a sectional view taken substantially along the line 3—3 of Figure 2;

Figure 4 is a fragmentary sectional view taken substantially along the line 4—4 of Figure 3;

Figure 5 is an enlarged fragmentary sectional view illustrating in detail the air inlet structure for the roller sphere illustrated in Figure 4;

Figure 6 is a fragmentary sectional view illustrating one of the air inlet driving jet structures;

Figure 7:
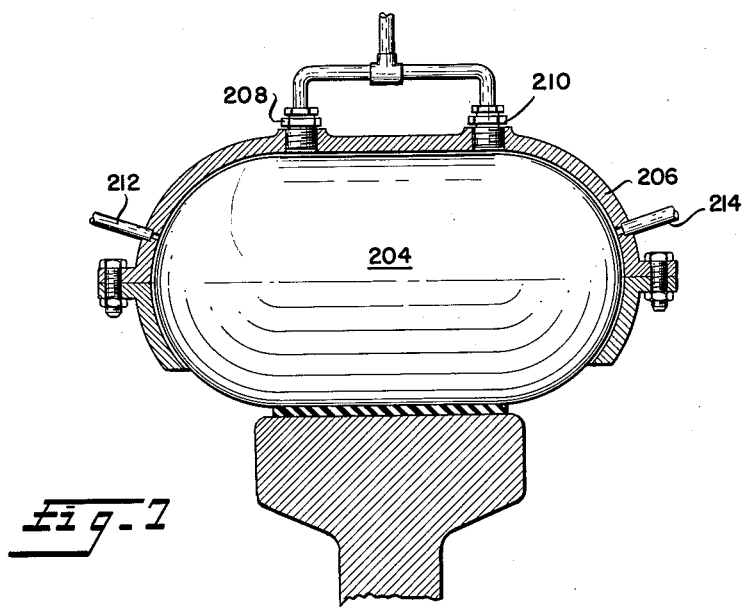
Figure 7 is a sectional view illustrating a generally cylindrical roller element, a second embodiment of the invention.

Referring now in detail to the drawings, and particularly to Figure 1, a plural car monorail train 10 comprising cars 12, 14 and 16 and end sections 18 and 20, is shown supported upon a monobeam 22 by a series of trucks 24, 26, 28 and 30. Car end sections 18 and 20 are fixed against relative pivotal movement relative to trucks 24 and 30 respectively whereas cars 12, 14 and 16 are articulated upon trucks 24, 26, 28 and 30 at their opposite ends as will be described in detail presently. The height and length of the cars 12 through 20 are not illustrated to scale in Figure 1 relative to the size of the rolling elements of the trucks 24 to 30 as illustrated in that figure.

As is best illustrated in Figures 2 and 3, each truck comprises a channel shaped rigid support or saddle 32 upon which are rigidly mounted, in the illustrated embodiment, six load supporting air ball bearing units 34, 36, 38, 40, 42 and 44 at its base wall 46 and on each of the side walls 48 and 50 of which are resiliently mounted three lateral guide air ball bearing units. The ball bearing units mounted on wall 48 are designated 52, 54 and 56 and the two of the three air ball bearing units mounted on wall 50 which are illustrated in Figure 3 are designated 58 and 60, these units being resiliently biased toward beam 22 by springs 61 to maintain rolling engagement therewith but having sufficient permitted lateral movement to enable the truck to round curved sections of the monobeam.

Air is supplied to the units 34 through 44 and 52 through 60 from a suitable source of air (not shown) under superatmospheric pressure through an inlet conduit 62 connected to a distribution manifold 64 to which the support units 34 through 44 are connected by conduits 66 through 76, to which the units 52 through 56 are connected by conduits 78 through 82 and to which the units 58 and 60 are connected by conduits 84 and 86 as illustrated in Figure 3. A similar connection is provided for the guide unit (not shown) which is mounted on wall 50 in transverse alignment with the unit 56.

Assuming that the weight of the car loaded is 30 metric tons (30,000 kilograms) with six air ball bearings in each truck or bogie, and an assumed effective average air pressure of 10 kilograms per square centimeter (approximately 142 pounds per square inch), the load per ball bearing will be 30,000÷12, or 2,500 kilograms. To support this weight, the projected area of each of the balls must be 2,500 kilograms divided by 10 kilograms per square centimeter, or 250 square centimeters. The minimum ball diameter must therefore be twice the square root of 250 divided by pi, or 18 centimeters approximately (approximately 7.1 inches). In order to assure an adequate margin of safety, the ball diameter is preferably based on twice the minimum projected area, or 500 square centimeters, with a resultant ball diameter of 25 centimeters or approximately 9.85 inches. Assuming a vehicle speed of 200 km. per hour, with a ball of this size the ball will be rotating at a speed of 4250 turns per minute, a relatively low speed and one which is perfectly satisfactory for operation in the present invention.

Referring again to Figure 3, the car 12 is mounted and articulated upon the saddle 32 by a king pin 88 fixed to the center of a cross beam 90 which is fixed at its opposite ends to the side walls 92 and 94 of the car 12. King pin 88 is pivotally and axially slidably received in a bushing 96 fixed to a channel shaped cross beam 98 which in turn is fixed to the top wall 46 of the saddle 32. Thus cross beam 90 is movable vertically relative to cross beam 98 and is pivotable relative thereto about the axis of king pin 88. The weight of the car 12 is supported upon the cross beam 98 by compression springs 100 and 102 housed in telescopic housings consisting of loosely interfitting members 104 and 106 for spring 100 and 108 and 110 for spring 102. Housing members 106 and 110 are fixed to cross beam 98. Housing members 104 and 108 are provided at their upper ends with bearing plates 112 and 114 respectively which abut bearing plates 116 and 118 respectively which are fixed to the lower face of the beam 90. By this construction, the car 12 is resiliently supported upon the truck frame 32 by the springs 100 and 102 and is free to pivot relative to the saddle 32 about the axis of the king pin 88 and is free for tilting movement to a limited extent to accommodate differing degrees of compression of springs 100 and 102. The normal height of the cars 12 through 20 in Figure 1 will actually be approximately 200 centimeters above the height of cross beam 90 (Figure 3).

Each of the support and guide air ball bearing units comprises, as is best illustrated in Figure 4, a spherical rolling element 120 substantially enclosed within a substantially spherical chamber 122 of a two part housing 124 having mating parts 126 and 128, the housing part 128 having a circular opening 130 therein through which a portion of the rolling element 120 protrudes. As is best illustrated in Figure 3, the rolling element 120 of the support air bearing units such as 36 ride upon a rail 132 extending longitudinally of and embedded in the top surface of the monobeam 22; the roller elements 120 of the upper guide air bearing units such as 58 and 52 engage rails 134 and 136 respectively embedded in and extending longitudinally of the opposite side faces of the monobeam 22 adjacent the top thereof; and the roller elements 120 of the air bearing units 60 and 54 engage rails 138 and 140 respectively embedded in and extending longitudinally of the opposite side faces of the monobeam 22 adjacent the bottom thereof. Since the guide air bearing units need not support the weight of the loaded vehicles, the air guide bearing units may be smaller than the support air bearing units, that is the roller elements 120 thereof and the associated races may be of proportionately lesser diameters.

The structure of one support air ball bearing unit 34 is illustrated in detail in Figures 4 to 6.

With reference to Figure 4, the support air ball bearing unit 34 shown therein comprises a protecting cover or housing 124 which encloses the bearing race or shell 122 for the spherical rotor 120 arranged for running as a wheel or roller on the rail 132, and an air braking device 142, the brake block 144 of which is adapted to cooperate with braking rails 146 and 148 extending longitudinally of and embedded in monobeam 22 on either side of the rail 132 (Figure 3). Pressure air is supplied to the bearing race through a conduit 68 and a ball valve 150 (Figure 5). A conduit 152 (Figure 4) branched-off from the manifold 64 supplies pressure air to the braking device 142 through a selectively actuatable two-way valve 154 and a conduit 156. The illustrated truck being a power truck rather than a trailer truck, conduit 158 connected to the manifold 64 supplies air under high pressure through a selectively actuatable control valve 160 and a conduit 162 to an injector 164 (Figure 6) having one or more nozzles 166 with orifices in the inner face 122 of the bearing race so that driving air can be supplied to the air space 168 between the roller 120 and the bearing race face 122. Nozzles 166 are set in an upwardly inclined direction as shown and are located close to a horizontal axial plane of the rotor 120. The surface of the rotor may be rough, e. g., provided with furrows, flutes, or indentations in order to offer as great a friction as possible between the air streams and the rotor surface. In the embodiment shown in the drawing, the rotor 120 will be rotated in the direction of the arrow 170 under the influence of air discharged from nozzle 164 and will drive the truck to the right as viewed in Figure 4. To this end, the illustrated location of the injector is apt because it augments the pressure air from conduit 68 for maintaining the carrying or truck supporting air cushion supplied to the entire space 168. Air is directed through a selectively actuatable control valve 172 and a conduit 174 to a reversely directed and located nozzle 176 to drive the roller in a counterclockwise direction as viewed in Figure 4 and to impart leftward movement to the truck. When the roller 120 is rotating, the appropriate one of the nozzles 164 or 176 can be utilized to impart a retarding torque to the rotor 120 to augment the action of the air brake 142.

The bearing race face 122 which is slightly greater than hemispherical in extent, comprises the entire interior face of housing member 126 and an upper annular zone of the lower housing member 128. Below the upper annular zone of the housing member 128 the inner surface of the housing member 128 is retracted at 180 from the rotor and leaves a comparatively free passage 182 for air flowing out of the space 168. Provided at the lower part of the housing member 128 is a choke ring 184 having for its object to retard the flow of air from the passage 182, thereby creating a certain counterpressure which balances the pressure present in the space 168 in case the latter occasionally should be too great in relation to the load applied to the bearing unit. Preferably the choke ring 184 is made of anti-friction material. By means of the lower housing member 128, the air flow in the bearing is directed toward the rail, thereby maintaining the same free of dust. In special instances, the metal rail 132 may be clad with a thin layer of resilient material, such as rubber or plastic. Even the surface of the rotor 120 may be covered with rubber or similar material. However, when a rail having a rubber layer is used, the rotor is preferably made of metallic material and hollow with a wall thickness chosen with regard to its particular application and sufficient to maintain its rigidity under the applied load.

The ball valve 150 is shown in Figure 5 on an enlarged scale. The ball 186 of the valve 150 is freely arranged in an essentially spherical chamber 188 which through a valve seat 190 is in communication with the air space 168 and through an opposite valve seat 192 is in communication with the air supply conduit 68. The ball 186 rolls on the rotor 120 when the latter rotates and is held in a central position by means of the air flow, so that the wear of the valve seats is maintained at a minimum. In the normal operation, the valve ball 186 is held in open position when pressure air is supplied. However, should the bearing housing 124 for some reason be uplifted from the rotor 120, the valve ball 186 engages or tends to engage valve seat 190 and thereby shuts off or throttles the air supplied to the space 168 and the rotor is brought back to its normal working position as a result of reduction in the pressure within the space 168. On the other hand, should the air space 168 be decreased, the valve ball 186 is lifted by the rotor 120 and opens wider the opening between it and valve seat 190 which results in an increased air supply to space 168 and greater air pressure therein. The ball valve 150 also closes for an abrupt pressure rise in the air space 168 such as may be caused by an obstacle on the rail, the ball 186 then being rapidly thrown toward the upper seat 192 and thus preventing the air of the space 168 from discharging back into conduit 68 through the valve 150. Finally it is observed, that when passing switches or the like, the rotor 120 may be suspended in its bearings, the rotor 120 bearing against the choke ring 184. In such a case, the ball valve 150 will close, so that no bearing air is used, and simultaneously the choke ring 184 brings about a closure of the bottom discharge outlet from space 182 and prevents the loss of driving air emanating from the injector 164 or 176.

Built into the housing part 126 are security bearings adapted to take over the load in case of failure of the pressure air. Provided for such purpose are three equiangularly spaced bearing bolts 194 (Figure 4) each consisting of a sleeve 196 (Figure 5) threaded into the wall of the housing part 126 and enclosing a member 198 of anti-friction material, such as graphite, oil-impregnated porous metal or the like. The inner surface of the bearing bolt which should be concavely curved to the same radius as the rotor 120, projects somewhat beyond the inner face 122 of housing part 126 so that the rotor never bears against said face 122 but the space 168 always is maintained at least to a minimum degree. Inserted into the bearing bolt 194 is an electric contact 200 inserted into a signal circuit, whereby the driver of the vehicle is able to supervise the working position of the rotor 120. The contacts 200 of the three bearing plugs 194 may be connected to separate signal circuits if desired. Also, the contact 200 may be replaced by a thermo-electric feeling means.

The foregoing description has been of a powered roller unit of a powered truck. Depending on the total driving force required, any selected one or more of the support air bearing units may be powered as illustrated in Figures 4 to 6 and any selected one or more of the trucks 24 to 30 of Figure 1 may be powered. The non-powered support air bearing units and the guide air bearing units such as 52 to 56 are identical with the powered unit illustrated in Figures 4 to 6 with the exception that the nozzles 164 and 174 and their associated air supply conduits and control valves are omitted and the rotor 120 has a perfectly smooth exterior surface.

It is suitable in all of the air bearing units to tilt the housing 124 in such a manner that its fore edge of opening 130 is located on a higher level that its aft edge, as the ability of the rotor 120 to absorb shock stresses due to roughness of the rail 132 is increased thereby.

The invention is not restricted to spherical rotors but may be applied to rollers of other suitable shapes as well. As an example, Figure 7 shows a cylindrical rotor 204 which is rotatable in a bearing race or housing 206 of a corresponding complementary form. The pressure air is supplied through two valves 208 and 210 of the same type as illustrated in the embodiment of Figure 4 and through passages 212 and 214 at either end of the rotor 204. The opposite ends of the rotor 204 are illustrated as being hemispherical but may also be planar or conical. In lieu of a truly cylindrical rolling face as shown in Figure 7, a convex rolling face in the form of a surface of revolution about the rotor rotation axis may be used, the rail then being preferably groove-shaped.

Figure 8:
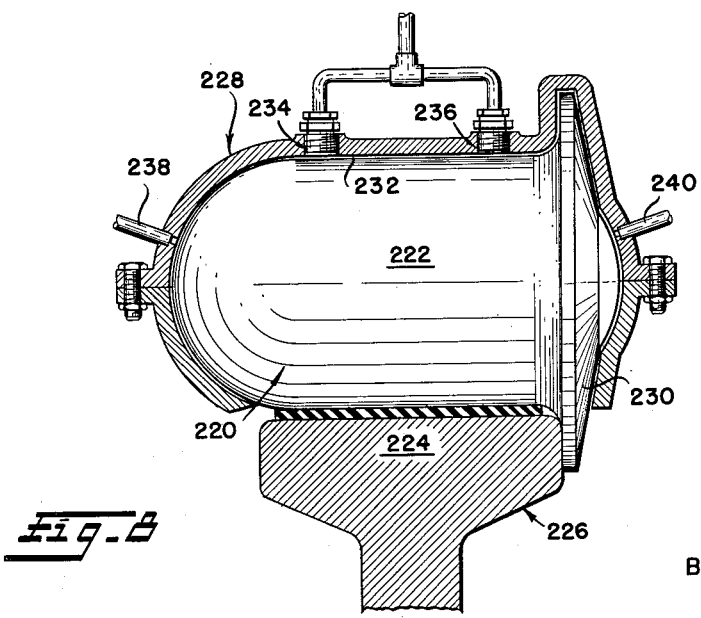
Figure 8 is a sectional view illustrating the application of the present invention principles to flanged rollers for use in conventional two rail railways.

The present invention is also applicable to trucks for vehicles supported and guided upon conventional spaced parallel rails as are used in the United States of America for railways. Figure 8 illustrates such an application. A roller 220 having a central cylindrical portion 222 substantially equal in axial length to the width of the top section 224 of a conventional rail 226 is enclosed within a complementarily shaped housing 228 and provided at one end with a radial guide flange 230 engaging the side of the rail top section 226 in substantially the same way as the flange of a conventional flanged railway car wheel. Air is introduced into the space 232 between the roller 222 and the housing 228 through valves 234 and 236 and end inlet conduits 238 and 240 as in the embodiment of Figure 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a vehicle body, a plurality of rollers adapted to roll upon the surface upon which said vehicle body is to be supported, and means for suspending said body upon said rollers including means for establishing and maintaining a film of flowing air over the surface of each of said rollers at a superatmospheric pressure at least sufficient to support the weight of said vehicle body.

2. The vehicle defined in claim 1 wherein said air film means includes a housing of complementary form to the form of said roller and enveloping all but a minor arcuate protruding portion of each of said rollers in slightly spaced relation to said rollers, and means for introducing air at a superatmospheric pressure into said housing means to establish a pressure within the space between said rollers and said housing means of sufficient magnitude to maintain said roller and said housing in spaced relation under load.

3. The vehicle defined in claim 2 wherein said rollers are spherical.

4. The vehicle defined in claim 1 wherein said roller has a portion in the form of a surface of revolution about its rotation axis.

5. The vehicle defined in claim 4 wherein said portion is cylindrical.

6. The vehicle defined in claim 5 wherein said roller has a radially projecting flange at one end of said cylindrical portion adapted to engage the side of a rail upon which said roller is supported.

7. The vehicle defined in claim 1 wherein means are provided for imparting a driving torque to at least one of said rollers to impart motion to said vehicle.

8. The vehicle defined in claim 7 wherein said driving torque providing means comprises means for directing a stream of air under pressure against the external surface of said roller in inclined relation thereto in the direction of roller rotation and air turbine means on said roller periphery in the path of said stream and acted upon by said stream to impart a driving torque to said roller.

9. In a vehicle, a housing defining a generally spherical chamber having a circular opening through a portion of the wall thereof of lesser diameter than the diameter of said spherical chamber, a spherical roller disposed in said chamber and having a diameter less than that of said chamber to provide a clearance between the external surface of said roller and the internal surface of said chamber in the order of a maximum of .005 inch, a portion of said roller projecting through said housing opening and being adapted to engage a vehicle support surface, means for introducing air into said chamber between the internal surface of said chamber and the external surface of said roller through an inlet disposed in diametrically opposed relation to said chamber opening and at a pressure sufficient to maintain the pressure exerted on said roller sufficient in magnitude to maintain said roller in spaced relation to the internal surface of said chamber.

10. The combination defined in claim 9 including means for aplying a driving torque to said roller to effect rotation thereof about a predetermined axis.

11. A truck for a rail supported vehicle, comprising a truck frame, a plurality of aligned load support roller members, and means fixed to said frame defining a retainer race surrounding each of said roller members, each said race having an opening therein through which a portion of said roller projects for rolling engagement with a rail, said races and said roller members being provided with interfitting complementary surfaces of revolution whereby said roller members are free to rotate with respect to said races, and means for maintaining a thin film of air between said surfaces of revolution whereby said roller members are isolated from physical contact with said races.

12. The combination defined in claim 11 wherein said roller members are spherical.

13. The combination defined in claim 11 wherein said truck frame is in the form of a saddle adapted to straddle a monobeam and wherein at least one guide roller member is disposed on each side of said beam and mounted on said truck frame and maintained in isolated rotation thereto by a film of flowing air in the same manner as said roller support member.

14. The combination defined in claim 13 wherein said guide roller members are of lesser diameter than the diameter of said roller support member.

15. The combination defined in claim 9 wherein said air introducing means comprises an air inlet conduit and valve means in said conduit and controlled by the movement of said roller relative to said inlet for controlling the flow of air from said conduit through said inlet into said chamber.

16. The combination defined in claim 15 wherein said valve means includes means for increasing air flow through said inlet as said roller approaches said inlet and for decreasing air flow through said inlet as said roller recedes from said inlet.

17. The combination defined in claim 15 wherein said valve means includes means for preventing flow of air from said chamber into said conduit in the event the fluid pressure in said chamber exceeds that in said conduit.

18. The combination defined in claim 15 wherein said valve means comprises a pair of spaced valve seats in said conduit one of which defines said inlet and a ball disposed in said conduit intermediate said valve seats and normally biased toward and having a portion projecting through said inlet defining valve seat into rolling engagement with the surface of said roller.

References Cited in the file of this patent

UNITED STATES PATENTS

| | | |
|---|---|---|
| 2,645,534 | Becker | July 14, 1953 |
| 2,710,234 | Hansen | June 7, 1955 |
| 2,932,258 | Marquard | Apr. 12, 1960 |

OTHER REFERENCES

"Product Engineering" publication, November 23, 1959, pages 68–70 referred to. (Copy available in Div. 45.)